United States Patent [19]

Kishi et al.

[11] 4,017,031

[45] Apr. 12, 1977

[54] MINIATURE ATOMIZER OF MANUAL TYPE

[75] Inventors: Takao Kishi; Takamitsu Nozawa, both of Tokyo, Japan

[73] Assignee: Yoshino Kogyosho Co., Ltd., Tokyo, Japan

[22] Filed: Sept. 25, 1975

[21] Appl. No.: 616,884

[30] Foreign Application Priority Data

Sept. 26, 1974 Japan ...................... 49-116183[U]

[52] U.S. Cl. ............................... 239/333; 222/321; 222/332; 222/375; 222/385

[51] Int. Cl.$^2$ ................... B05B 9/043; G01F 11/36

[58] Field of Search .......... 222/320, 321, 332, 372, 222/375, 380, 381, 383, 384, 385, 387, 397, 402.2; 239/331, 333

[56] References Cited

UNITED STATES PATENTS

| | | | |
|---|---|---|---|
| 3,248,021 | 4/1966 | Corsette et al. | 222/385 X |
| 3,391,647 | 7/1968 | Corsette et al. | 222/385 X |
| 3,583,605 | 6/1971 | Corsette | 222/383 X |
| 3,724,726 | 4/1973 | Susuki et al. | 222/385 |
| 3,753,518 | 8/1973 | Kutik | 222/383 |
| 3,774,849 | 11/1973 | Boris | 222/385 X |
| 3,779,464 | 12/1973 | Malone | 222/321 X |
| 3,908,870 | 9/1975 | Nozawa et al. | 222/321 |

*Primary Examiner*—Johnny D. Cherry
*Assistant Examiner*—Andres Kashnikow
*Attorney, Agent, or Firm*—Edwin E. Greigg

[57] ABSTRACT

A miniature type, rechargeable atomizing spray mechanism including a receptacle for the liquid to be atomized, and further including a cap and axially aligned first and second pressure chambers, one of which depends within the receptacle while the other projects above the cap. A reciprocable spray head is arranged to cooperate with plural pistons, one each of which are slidably arranged in said first and second pressure chambers. Upper and lower valve members are available to control the emission of spray. The upper valve is maintained closed by a spring element, and the lower valve is opened by reciprocation of the spray head to permit withdrawal of the liquid from the container so that it may pass through a bore provided between the plural pistons and be emitted as a spray from the spray head.

6 Claims, 6 Drawing Figures

MINIATURE ATOMIZER OF MANUAL TYPE

BACKGROUND OF THE INVENTION

1. Field of the Invention

The present invention relates to an atomizer, and more particularly to a miniature atomizer of manual type for atomizing a liquid such as perfume or cosmetic preparations, in a state of fine spray.

2. Description of the Prior Art

A miniature atomizer of the so-called "aerosol" type has been widely used heretofore because of its convenience in handling. Atomizers of this type have, however, certain drawbacks, e.g., its production cost is relatively high and carrier gases are inevitably left in its container even after disposal. The latter drawback becomes serious sometimes since the atomizer confining such combustible gases may be caused to unintentionally explode due to some cause. Accordingly, for these reasons, the attentions of users are again attracted to a miniature atomizer of the manual type disclosed herein which inherently has none of those drawbacks.

In the manual-type miniature atomizer, a coil spring is currently used to return the atomizer head to its original non-actuated position. Elements or parts including such coil spring become similar and smaller as a consequence of scaling-down the miniature atomizer as a whole. Thus, assembly of the smaller atomizers becomes much more difficult, and furthermore these elements from which they are built are liable to be lost. For a miniature atomizer having a complicated construction, therefore, not only its overall assembly is difficult, but also it requires many steps and delicate skills to mount the return coil spring in position.

The present invention is directed to improvements upon an invention disclosed in our U.S. Pat. No. 3,908,870, issued Sept. 30, 1975. The invention of that patent relates to a highly efficient miniature atomizer of manual type, which has a relatively complicated structure. Generally speaking, in order to improve the pumping efficiency of such a complicated miniature atomizer, it is conceivable to provide a member which is operative to reduce the working chamber defined mainly by a sliding tubular member, as used in miniature atomizers. It is, however, difficult to assemble the tubular member into the atomizer without deteriorating efficiency in the overall assembly process.

Another difficulty to be solved in the use of a miniature atomizer including the atomizer disclosed in our earlier patent is that the possibility of leakage of a working liquid is increased since the atomizer is designed in such a manner that the compressed air is allowed to be exhausted to the open air as well as into the inside of the liquid container, when the tubular piston is moved downward to its lowermost position, so that the liquid can be introduced reliably into the pressure chamber by just a short spray priming time even for the first use.

SUMMARY OF THE INVENTION

It is, therefore, the principal object of the present invention to provide a manual-type miniature atomizer, from which the above drawbacks are precluded.

Another but important object of the present invention is to provide an improved manual-type miniature atomizer which can be operated reliably and efficiently even for its first use.

Still another object of the present invention is to provide an improved manual-type miniature atomizer, into which elements including a return coil spring can be assembled simply and conveniently.

A further object of the present invention is to provide an improved manual-type miniature atomizer which is featured by such a construction as can easily accomplish replacement in a pumping or pressure chamber between air and a working liquid even for its first use without any accompanying leakage of the liquid to the outside.

A still further object of the present invention is to provide an improved manual-type miniature atomizer which is free from any establishment of excessive vacuum in its container even after the quantity of the liquid therein is reduced substantially through a number of depressing operations.

Other objects and advantages of the present invention will be more readily apparent from a further consideration of the following detailed description of the drawings illustrating a preferred embodiment of the invention, in which:

DESCRIPTION OF THE PREFERRED EMBODIMENTS

Figure 1:
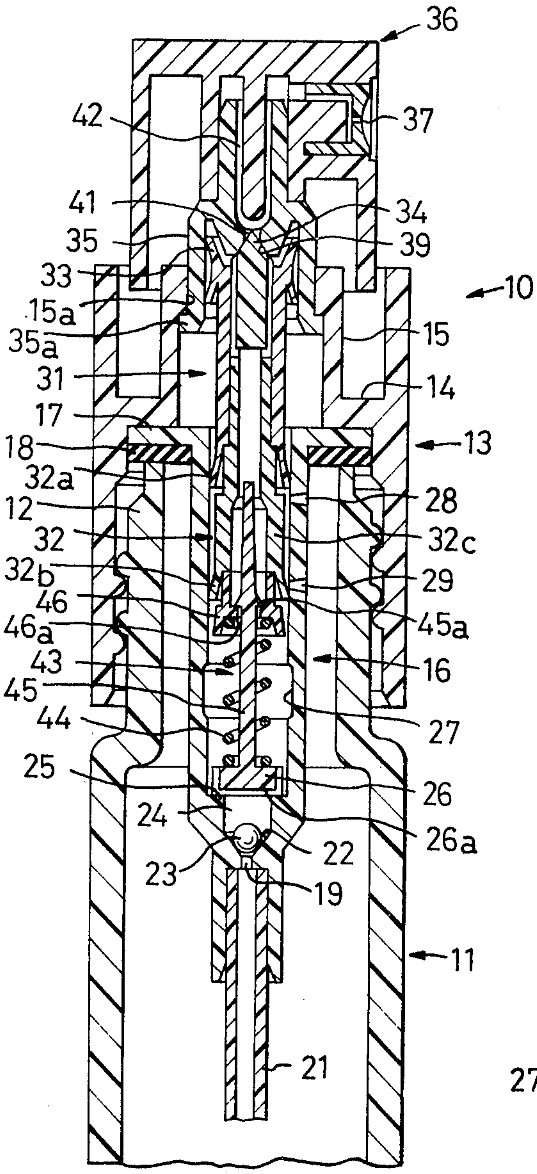
FIGS. 1 and 2 are longitudinal sections of an upper portion of a miniature atomizer exemplifying the present invention, the former showing the condition before the atomizer head is depressed while the latter shows the condition during the depressing operation.
Figure 3A:
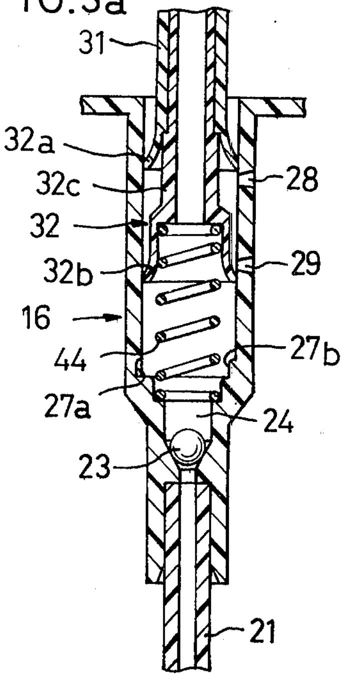
FIGS. 3*a* and 3*b* are simplified enlarged sectional views of a sliding portion of the lower piston and its related elements exemplifying another feature of the present invention, the former showing the condition before the atomizer head is depressed while the latter shows the condition during the depressing operation.
Figure 3B:
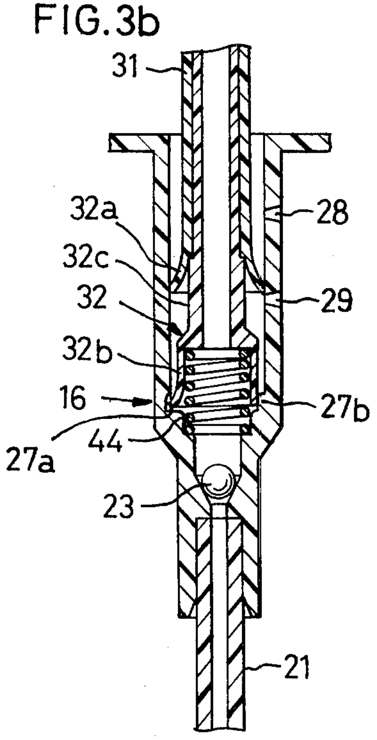
Figure 2:
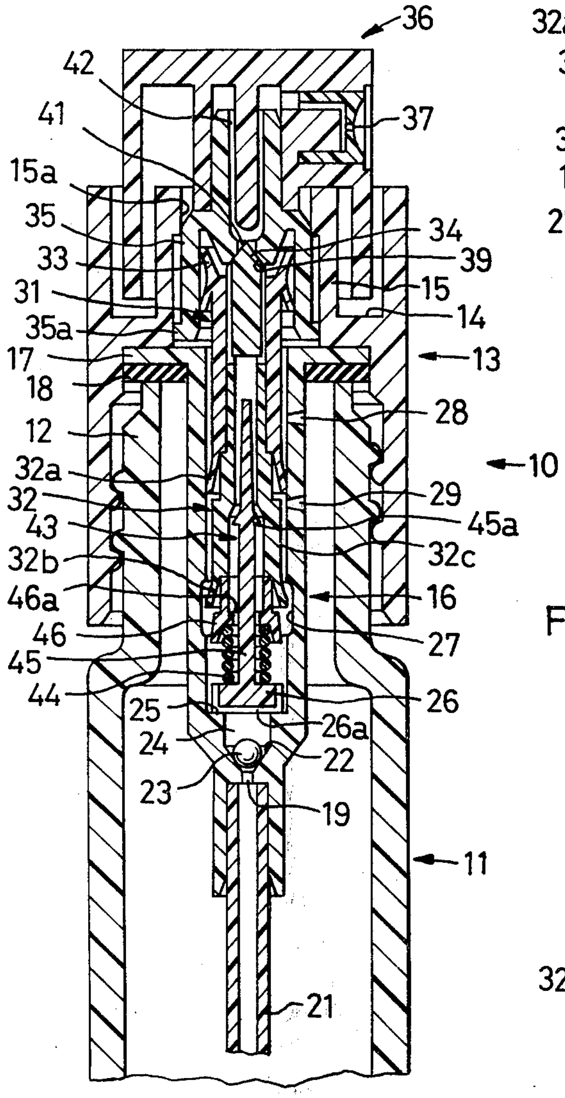
Figure 4A:
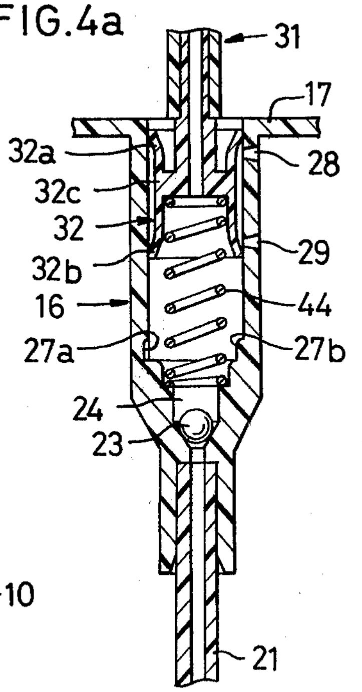
FIGS. 4*a* and 4*b* are further views that are generally similar to FIGS. 3*a* and 3*b* but show another embodiment of the present invention.
Figure 4B:
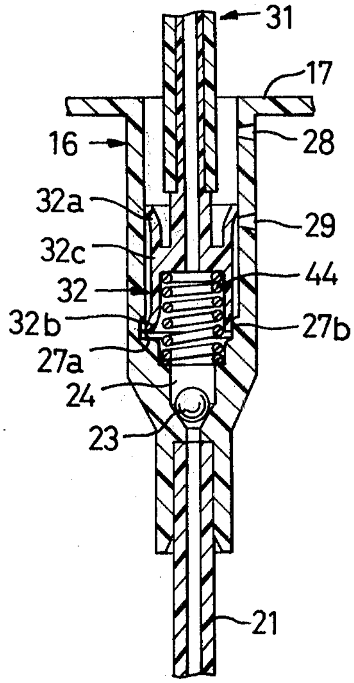

A manual-type miniature atomizer according to the present invention will now be described with reference to FIGS. 1 and 2. The miniature atomizer, as generally indicated at reference numeral 10, includes a liquid container 11 which is formed with a neck portion 12. The atomizer 10 further includes a guide tube 13 or cap which has its lower half screwed on the neck portion 12. This cap 13 is formed with an inward flange 14 substantially medially thereof. An engaging tubular portion 15 is made to extend upward from the innermost end of the inward flange 14. A cylinder 16 is also provided, which is made to extend downward into the liquid container 11 through the bore of the neck portion 12 and forms a part of a first pressure chamber. This cylinder 16 is formed at its upper end with an outward flange 17, which in turn is retained through a packing 18 between the upper end of the mouth of the container 11 and the inward flange 14 of the cap 13. The cylinder 16 is also formed at its lower portion with a restricted bore which acts as a valve opening 19. In the lower portion of the cylinder 16, there is fitted a suction tube 21 in a manner to have communication with the valve opening 19. This suction tube 21 is made to depend from the cylinder 16 to such an extent that its lower extremity reaches the bottom wall of the liquid container 11. The inside wall of the cylinder 16 is partially counter-tapered immediately above the valve opening 19 to provide a valve seat 22, on which a ball type valve member 23 may be seated in operation. The inside space of the cylinder 16 is, on the other hand, formed at its lower portion with a restricted valve chamber 24, which has its lower wall merging into the counter-tapered wall of the valve seat 22. As a result, a step portion 25 is formed, which acts as a stop or seat for a foot portion 26, as will be described in greater detail hereinafter. Moreover, the inside wall of the cylinder 16 is formed with a recess 27 which is provided slightly above the step portion 25. Said recess may be of annular shape. Above the recess there are provided in cylinder 16 vertically spaced vent holes 28 and 29. The aforementioned recess and vent holes 27, 28 and 29 will also be described in greater detail hereinafter.

Generally indicated at reference numeral 31 is a sliding tubular member, which has its lower portion inserted into the bore of the cylinder 16. This tubular member 31 is formed at least with a first tubular piston 32 at its lower end and with a second tubular piston 33 at its upper end. A valve member 34, which may be of needle type, is inserted with a slight clearance in the bore of the tubular member 31 at its upper end portion in a manner to have its upper tip protruding therefrom. Thus, fluid communication is provided between the clearance around the valve member 34 and the inside space of the cylinder 16 by way of the bore of the tubular member 31.

In this instance, moreover, the first tubular piston 32 of the tubular member 31 is formed both with upper and lower sealing skirts **32*a* and 32*b*, which are made to contact hermetically with the inside wall of the cylinder 16, and with a restricted portion which is positioned between the two skirts 32*a* and 32*b* and which has a smaller diameter than that of the cylinder 16. These portions 32*a* to 32*c* of the tubular piston 32** will also be described in more detail hereinafter.

The second tubular piston 33 is inserted into a larger cylinder 35 which has a larger diameter than that of the first cylinder 16. Thus, it will be appreciated that there is now provided a further second pressure chamber in axial alignment with the first pressure chamber above the cap 13. This larger cylinder 35 is made to depend from an atomizer head 36, which in turn is formed with a nozzle outlet 37. The cylinder 35 is inserted in a vertically slidable fashion into the bore of the aforementioned tubular portion 15. The operational interaction between the tubular portion 15 and the larger cylinder 35 is provided by the engagement between an annular inward land **15*a*, which is formed at the upper extremity of the former element 15, and an annular outward land 35*a* which is formed at the lower extremity of the latter element 35. This larger cylinder 35 is formed at its lowermost center wall with a valve seat 39 and a valve opening 41, the latter having fluid communication with the nozzle outlet 37 by way of a valve passage 42**.

Generally indicated at reference numeral 43 is a spring mounting member, which is interposed between the step portion 25 of the inside wall of the smaller cylinder 16 and the sliding tubular member 31 so as to mount and carry thereon a coil spring 44. This spring mounting member 43 includes the foot portion 26 which can be seated on the step portion 25 of the cylinder 16. Further inclusive is a guide rod 45 which is made to extend upright from the upper center wall of the foot portion 26. Thus, the coil spring 44 is mounted or fitted on this rod 45. As the occasion demands a spring holder 46 including an annular member may be also mounted on the guide rod so as to hold in position, i.e., prevent detachment of the coil spring 44. Detachment of this spring holder 46 in turn can be obviated by the engagement between detents **45*a*, which are formed at both sides of an upper portion of the guide rod 45, and an inward flange 46*a* which is formed on the inner wall of a middle portion of the spring holder 46. Upon assembly of the spring mounting member 43, the coil spring 44 is preset under slight compression when the spring holder 46 is retained by the detents 45*a*. On the other hand, the guide rod 45 has such a length as to have its upper portion inserted freely in the bore of the tubular member 31. A fluid passage or by-pass 26*a* is provided on the lower and side walls of the foot portion 26**.

With these construction arrangements, when the atomizer head 36 is manually depressed in operation, the inside spaces (which will be referred shortly to as a pressure chamber) of all the lower cylinder 16, the tubular member 31 and the larger cylinder 35 are compressed, since the two valve members 23 and 34 are kept closed. When the pressure in one pressure chamber is boosted to a predetermined level as the depressing operation proceeds, then the tubular member 31 is moved downward together with the valve member 34 by the difference in an effective area between the first and second tubular pistons 32 and 33, thus effecting the desired atomization of the fluid through the nozzle outlet 37. When, moreover, the downward speed of the atomizer head 36 is reduced as the depressing operation approaches to its final stage, then the pressure prevailing in the atomizer 10 is accordingly lowered. At this stage, the valve member 34 shuts off the valve opening 41 to stop the atomizing operation. When the atomizer head 36 is subsequently released, the tubular member 31 and the atomizer head 36 are pushed upward by the biasing action of the coil spring 44. Meanwhile, the inside space of the lower cylinder 16 is evacuated to a vacuum level, so that the liquid confined in the container 11 is sucked thereinto by way of the suction tube 21 and the valve opening 19 for the next cycle of operation. The detail of the operations of the present miniature atomizer 10 is partially common to and can be referred, if desired, to aforementioned U.S. Pat. No. 3,908,870, issued Sept. 30, 1975.

Since the coil spring 46 is mounted in position on the spring mounting member 43, it can be assembled into the inside of the atomizer 10 together with that particular mounting member 43. Moreover, since the mounting member 43 is provided with the foot portion 26, the spring inserting step into the assembly of the elements is so remarkably simplified as to accomplish the assembly process promptly. On the other hand, the guide rod 45 of the spring mounting member 43 is inserted into the bore of the sliding tubular member 31 when the atomizer head 36 is depressed. As a result, this guide rod 45 can be expected to act as the volume reducing member which reduces the volume of the bore of the tubular member 31 under that depressed condition. Thus, the guide rod 45 has two important functions, that is, to guide the coil spring 44 and to act as the volume reducing member for the atomizer 10 which is operated under high compression. It should, therefore, be appreciated that the present invention can provide a highly efficient atomizer of miniature size, which can be assembled simply and conveniently.

When, on the other hand, the miniature atomizer is to be used for the first time, it is impossible to introduce the liquid into the pressure chamber until the air, which has occupied that pressure chamber, is discharged. In the case, more specifically, where the atomizer has such a construction as has its valve member 34 kept closed until the pressure prevailing in the pressure chamber reaches a predetermined level, the air therein is still left under a compressed condition even after the depressing operation of the atomizer head 36 is finished. As a result, the evacuation of the pressure chamber remains insufficient even after the atomizer head 36 is returned to its raised position. Thus, the amount of introduction of the liquid into the pressure chamber would be insufficient, and a multiple number of depressing operations of the atomizer head 36 would be indispensable for scavenging the pressure chamber, if it were not for the construction as will be disclosed in the following.

More specifically, in one of the satisfactory evacuating constructions as disclosed in connection with the embodiments of FIGS. 8 to 11 of the aforementioned U.S. Patent, a clearance forming portion e.g., a recess or projection for releasing the sealing effect of the piston portion is formed on the lower inner face of the lower smaller cylinder, and at the same time an air vent hole acting also as a vacuum preventive hole on the inside of the container is formed in the wall of the smaller cylinder. When, therefore, the sliding tubular member is pushed downward to its lowermost position, the pressure in the pressure chamber is released so that it is allowed to flow into the inside of the liquid container by way of the clearance between the outer faces of the piston portion and the tubular member and the inner face of the smaller cylinder and then through the air vent hole, which corresponds to the vent hole 28 of the miniature atomizer according to the present invention. However, this construction raises another problem to be solved. When, the tubular member is moved downward to its lowermost position as in the above, the remaining pressure will not only be relieved through the vent hole 28 but also be allowed to flow upward and then to leak to the outside of the miniature atomizer around the mouth portion of the smaller cylinder. As a result, upon the first use of the atomizer, not only the compressed air is discharged, but, in the subsequent depressing operations, the liquid is entrained by the air and is discharged together, causing leakage of the liquid.

An important feature of the present invention for solving the above problem will now be described in conjunction with the recess 27, the vertically spaced vent holes 28 and 29, and the sealing skirts 32*a* and 32*b*.

Particular reference will now be made to FIGS. 3*a* and 3*b*, and 4*a* and 4*b*, in which the spring mounting member 43 as well as the annular member 46 are removed for simplicity of discussion only. As has been already described earlier, the vent holes 28 and 29 are formed in the inside wall of the cylinder 16 in predetermined vertical spaced relation relative to each other, as better seen from FIGS. 3*a* and 3*b*. At the same time, the clearance forming portion or recess 27 is formed in the lower inside wall of the smaller cylinder 16.

On the other hand, the first tubular piston of the sliding tubular member 31 is formed with the upper and lower sealing skirts 32*a* and 32*b* and with the restricted portion 32*c*, as has been described earlier. When, therefore, the sliding tubular member 31 is located in its uppermost position, the two vent holes 28 and 29 are positioned to face the restricted portion 32*c*, and the skirts 32*a* and 32*b* serve to provide their sealing effects above the upper vent hole 28 and below the lower vent hole 29, respectively. Under this condition, as the tubular member 31 is moved downward, the upper skirt 32*a* goes below the vent hole 28, and the lower skirt 32*b* goes into the clearance forming portion when the tubular member 31 approaches its lowermost position. At this particular instant, the lower skirt 32*b* has its sealing function lost, in other words, released by the clearance forming portion 27. This portion 27 may be exemplified either by the recess 27, which has a larger inside diameter than the outside diameter of the skirt 32*b* as shown in FIGS. 1 and 2, or by a groove 27*a* or a projection 27*b* as shown in FIGS. 3*a* and 3*b*, or 4*a* and 4*b*. In the latter embodiment, the projection 27*b* may be formed such that a portion of the circumferential edge of the lower skirt 32*b* rides on that projection to form the desired clearance or relief passage at both sides of the projection 27*b*. In any of the above embodiments, when the sliding tubular member 31 is moved downward to its lowermost position, the lower skirt 32*b* cannot have hermetical sealing contact with the inside wall of the smaller cylinder 16 by the action of either the recess, the groove 27*a* or the projection 27*b*. As a result, the desired relief passage is established to provide fluid communication between the lower skirt 32*b* and the clearance forming portion 27 and between the restricted portion 32*c* and the facing inside wall of the smaller cylinder 16 and through the lower vent hole 29. At this instant, however, it should be noted that the sealing effect is still obtained in a position between the two vent holes 29 and 28 by the action of the upper skirt 32*a*, thus preventing the compressed air in the pressure chamber from leaking to the outside of the miniature atomizer 10 around the mouth portion of the cylinder 16 together with the liquid.

The space provided between the several vents 28 and 29 is suitably determined by the length and stroke of the first tubular piston 32. The vacuum preventive hole 28 acts to prevent excessive vacuum from taking place in the liquid container 11 even after the liquid in the container 11 is gradually reduced through its atomizing process. This vent hole 28 is so positioned as to be closed by the first tubular piston 32 or its skirts 32*a* and 32*b* when the tubular member 31 comes to its uppermost position and as to be opened, when the piston 32 is moved downward, thereby to permit therethrough introduction of the ambient air into the liquid container 11.

As has been described hereinbefore, the manual-type miniature atomizer according to the present invention can be operated without any difficulty or trouble even in its first use, although it has such a construction that the air is forcibly compressed midway of the liquid passage leading from the inside of the container to the nozzle outlet. This operation can be ensured by forming the relief passage, which is temporarily provided when the tubular member comes to its lowermost position to return not only the air but also the liquid in the pressure chamber to the inside of the container. Thus, it should be appreciated that the desired liquid suction into the pressure chamber can be accomplished reliably and promptly upon elevation of the tubular member even for the first use of the atomizer. By the combination of the two vent holes, moreover, the desired prevention of excessive evacuation of the container can be efficiently effected, and at the same time the replacement between the air in the pressure chamber and the liquid can be made without any difficulty. Thus, it should also be appreciated that a predetermined amount of liquid atomization can be readily accomplished for every atomizing operation. Since, moreover, the two vent holes are closed by the first tubular piston, especially, by its two skirts when the tubular member is located in its uppermost position, it further should be appreciated that the desired efficient prevention of liquid leakage can be obtained. In view of the foregoing, it is believed that the significance of these improvements over our earlier patent will be readily appreciated.

What is claimed is:

1. A liquid spraying device comprising a container for liquid, including an axially perforated cap, spray means including a nozzle associated with said container and including reciprocable means extending through said cap, first pressure chamber means depending beneath said cap, second pressure chamber means in axial alignment with said first pressure chamber means and positioned above said cap, said reciprocable means including a first piston member in the first pressure chamber means and a second piston member in said second pressure chamber means and further including first valve means, said valve means being arranged to control liquid flow from said second pressure chamber to the nozzle of said spray means, spring means arranged to maintain said first valve means in a closed condition to prevent inadvertent emission of liquid therefrom, second valve means in said first pressure chamber means, liquid carrying means depending from said last-named means and extending into said container, further characterized by said first pressure chamber means including spaced upper and lower vent means, said first piston member including plural axially spaced upper and lower skirt means adapted to open and close said plural vent means upon reciprocation of said spray means.

2. A liquid spraying device as defined in claim 1, in which the said lower skirt means is arranged to support an annular member for reception of said spring means.

3. A liquid spraying device as defined in claim 2, in which a guide rod is arranged to support said spring means and penetrate said annular member.

4. A liquid spraying device as defined in claim 3 in which said first pressure chamber includes a cylinder having an inner wall provided with a stepped portion arranged to cooperate with said lower skirt means.

5. A liquid spraying device as defined in claim 4, in which said cylinder has an annular recess disposed between the said stepped inner portion and the lower vent means.

6. A liquid spraying device as defined in claim 5, in which said upper and lower skirt means are in sealing engagement with said inner wall of said cylinder.

* * * * *